United States Patent [19]

Pullman et al.

[11] Patent Number: 5,227,802
[45] Date of Patent: Jul. 13, 1993

[54] SATELLITE SYSTEM CELL MANAGEMENT

[75] Inventors: Michele A. Pullman; Kenneth M. Peterson, both of Phoenix, Ariz.

[73] Assignee: Motorola, Inc., Schaumburg, Ill.

[21] Appl. No.: 812,389

[22] Filed: Dec. 23, 1991

[51] Int. Cl.⁵ .......................... H04B 7/185; H04B 7/19
[52] U.S. Cl. ....................................... 342/352; 342/354
[58] Field of Search ............... 342/350, 352, 353, 354, 342/360

[56] References Cited

U.S. PATENT DOCUMENTS

| | | | |
|---|---|---|---|
| 3,541,553 | 11/1970 | Gubin | 342/353 |
| 3,928,804 | 12/1975 | Schmidt et al. | 342/353 |
| 4,502,051 | 2/1985 | Dondl | 342/356 |
| 4,630,058 | 12/1986 | Brown | 342/359 |

OTHER PUBLICATIONS

An article entitled "Analytic Design of Satellite Constellations for Zonal Earth Coverage using Inclined Circular Orbits" by L. Rider, *The Journal of the Astronautical Sciences*, vol. 34, No. 1, Jan.-Mar. 1986, pp. 31-34.

An article entitled "Circular Polar Constellations Providing Continuous Single or Multiple Coverage Above a Specified Latitude" by W. S. Adams and L. Rider, *The Journal of the Astronautical Sciences*, vol. 35, No. 2, Apr.-Jun. 1987, pp. 155-192.

*Primary Examiner*—Gregory C. Issing
*Attorney, Agent, or Firm*—Robert M. Handy

[57] ABSTRACT

There is provided a method and means for controlling the amount of overlap and gaps in coverage of antenna pattern cells of a moving satellite communication system, by determining the relative spatial location of overlapping or gaping cells of converging or diverging satellites as a function of time; determining a point where antenna coverage of one or more cells from a first moving satellite will overlap or gap one or more cells from a second satellite; and turning off or on one or more of the overlapping or gaping cells so as to eliminate interference therebetween without leaving substantial coverage gaps between adjacent antenna patterns.

25 Claims, 6 Drawing Sheets

SATELLITE SYSTEM CELL MANAGEMENT

FIELD OF THE INVENTION

The present invention pertains to multiple satellites moving relative to each other and with antennas having multiple cell coverage of the earth.

BACKGROUND OF THE INVENTION

Satellites are becoming important links for communication between stations at different locations throughout the world, particularly for mobile communication stations. For a satellite system to give worldwide coverage, a network or constellation of satellites is desirable. The minimum number of satellites and their orbital requirements to achieve continuous single or multiple coverage on various parts of the earth have been described in *The Journal of the Astronautical Science*, for example, "Analytic Design of Satellite Constellations for Zonal Earth Coverage Using Inclined Circular Orbits" by L. Rider, VOL 34. No. 1 January–March 1986, pp. 31–64, and "Circular Polar Constellations Providing Continuous Single or Multiple Coverage Above a Specified Latitude" by W. S. Adams and L. Rider, Vol 35, No. 2 April–June 1987, pp. 155–192.

Each satellite within such a satellite constellation has one or more directional antennas producing a coverage pattern on earth referred to as the "foot-print" of the satellite antenna. When multiple polar orbiting satellites are used, the satellites converge towards the poles and antenna footprints begin to overlap.

In the past overlap of antenna patterns has often been desired (see for example, Adams and Rider, supra). But, where the antenna footprint is made up of separate "cells" in which individual communication is to take place, overlap may not be desirable. When cells from one satellite overlap cells from another satellite, there is redundancy of coverage and potential communication interference. Thus, there is an ongoing need to avoid such interference problems in multi-satellite cellular systems.

As used herein, the term "satellite" is meant to include any satellite moving relative to another satellite. Non-limiting examples are, multiple satellites which converge during orbit or one or more satellites moving relative to a geostationary satellite. The term "cell" is intended to refer to one or more portions of an antenna pattern in which communication may occur independent of communications in other portions (i.e., other cells) of the antenna pattern

SUMMARY OF THE INVENTION

Accordingly, a purpose of this invention is to provide an antenna coverage management means and method which modifies satellite antenna patterns so as to reduce or eliminate interference or signal confusion to a ground-based user communicating with one or more of the satellites.

A method of operation of a satellite communication system involving two or more satellites whose antenna patterns overlap or gap during some portion of an orbit of at least one of the satellites, comprises; determining, respectively, first and second antenna coverage patterns of antennas of first and second satellites; determining when the first and second antenna coverage patterns overlap or gap as one of the first or second satellites moves with respect to the other; and modifying the antenna coverage pattern of one or both satellites as a function of time to avoid substantially interfering overlap or significant no-coverage gap.

In a preferred embodiment, the antenna coverage patterns comprise cells whose activity is adapted to be modified and the first determining step comprises computing locations of centers of at least peripheral cells of the antenna patterns and calculating center-to-center distances of approaching or receding cells of the first and second antenna coverage patterns. The calculated center-to-center distances are desirably compared to predetermined center-to-center distances for the same cells and the antenna coverage pattern of one or both satellites modified when the calculated center-to-center distances differ from the predetermined center-to-center distance where substantial interference or non-coverage gap would occur as the satellites approach or depart. The antenna coverage patterns are modified by changing the number or size or location or activity of the cells, or by turning particular cells on or off.

There is further provided a system for managing satellite antenna coverage to avoid interference or gaps between antenna patterns of approaching satellites, comprising, memory means for storing information concerning predetermined portions of an orbit when an antenna pattern of one satellite will or will not interfere with an antenna pattern of another satellite, satellite locator means for determining current orbital information of the one satellite, and controller means for comparing such current orbital information to the stored orbital information to determine when a predetermined decision criteria is met, and then modifying an antenna pattern associated with the one or other satellite to avoid substantial interference or gaps between their antenna patterns.

In a preferred embodiment, the system further comprises a communication routing matrix for altering routing of transmitted or received signals to or from individually controllable cells of an antenna and the memory means, locator means and controller means are on board one or the other satellite.

The antenna pattern contains cells and wherein the controller means for modifying the antenna pattern further desirably comprises means for turning off or on individual antenna cells or for varying the shape and size of individual antenna cells.

BRIEF DESCRIPTION OF THE DRAWINGS

FIG. 6 is a simplified flow diagram showing a preferred method for determining which cell to turn off or turn on.

DESCRIPTION OF THE PREFERRED EMBODIMENT

The present invention provides a novel cell management method and apparatus for determining which cells of a multi-celled satellite antenna pattern to turn on and off or otherwise vary as a function of time and/or orbital position. While the method and apparatus of the present invention are described for a constellation of low earth orbiting satellites, this is merely for convenience of explanation and not intended to be limiting. The present invention applies to any system having at least two relatively moving satellites whose antenna foot-prints have varying overlap. Both satellites may be moving or one may be moving and the other geostationary.

Figure 1:
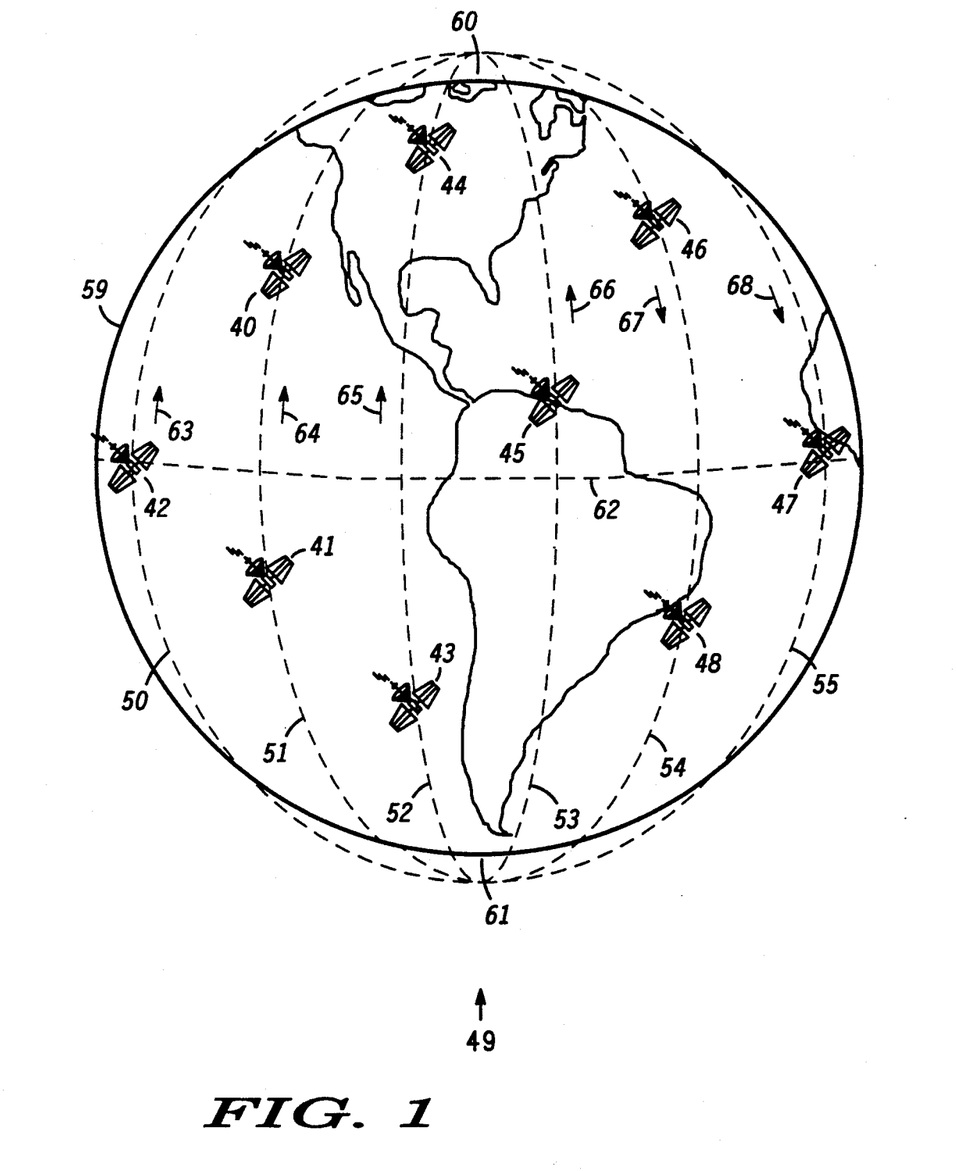
FIG. 1 is a simplified diagram depicting multiple low earth orbiting satellites in substantially polar orbits around the earth.

FIG. 1 shows a constellation of low earth orbiting satellites of satellite communication system 49 in a substantially polar orbit. Satellite 42 moves around earth 59 in orbit 50. Satellites 40 and 41 move around earth 59 in orbit 51. Satellites 43 and 44 move around earth 59 in orbit 52. Satellite 45 moves around earth 59 in orbit 53. Satellites 46 and 48 move around earth 59 in orbit 54 and satellite 47 in orbit 55. Earth 59 has north pole 60 and south pole 61. Equator 62 is shown as a dotted line on earth 59.

Arrows 63 thru 68 indicate the direction of orbits 50 thru 55 as seen from a distant point in space. Orbits 50 thru 53 move towards pole 60, and once past pole 60 they descend toward pole 61. Orbits 54 and 55 move towards pole 61 and once past pole 61 ascend toward pole 60. There is a region where the orbits of the satellites moving toward pole 60 (e.g., orbit 53) and the orbits of the satellites moving towards pole 61 (e.g., orbit 54) are in opposite directions. This difference between adjacent orbits where the satellites are orbiting in opposite directions is called the "seam". The relative velocity of satellites moving in "opposite-direction" orbits 53, 54 on either side of the seam is much greater than the relative velocity between satellites in the "same-direction" orbits 50–53.

It is apparent from FIG. 1 that the separation distance between satellites in adjacent orbits, (for example, between satellite 40 and satellite 44), decreases as they approach the poles and that the separation distance increases as the satellites recede from the poles. The maximum separation between satellites in adjacent orbits occurs at equator 62, and the minimum separation at poles 60 and 61. The separation distance between satellites in the same orbit remains the same. For example, the separation distance between satellites 40 and 41 remains constant while the separation distance between satellites 40 and 44 changes. The same is true of the satellites in other orbits.

Figure 2:
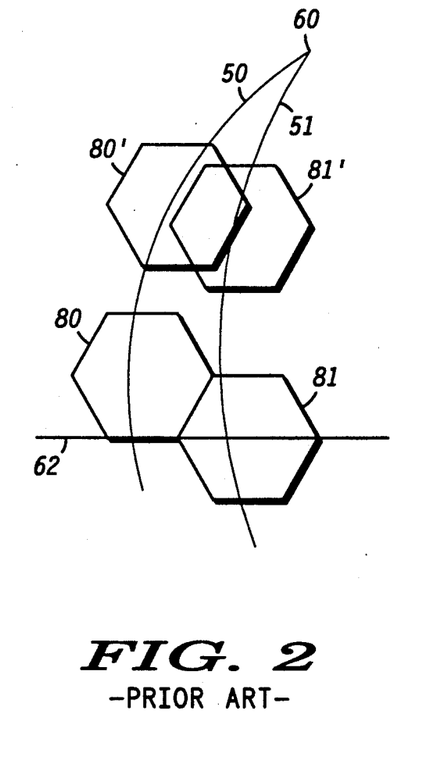
FIG. 2 is a simplified view showing antenna coverage patterns of adjacent satellites as projected on the earth without antenna cell management and at different points in their polar orbits.

FIG. 2 is a simplified view showing antenna coverage patterns (i.e. "footprints") 80 and 81 of satellites 42 and 41, respectively, of FIG. 1 as projected on the earth at different points in their orbits 50,51 according to the prior art (e.g. see Rider or Rider and Adams, supra). At equator 62, antenna coverage patterns 80 and 81 are just touching each other. Near pole 60 antenna coverage patterns 80 and 81 (now labeled patterns 80' and 81') overlap to a great extent because orbits 50, 51 and satellites 42, 41 converge. As the satellites approach pole 60, there is significant overlap of antenna pattern coverage. The overlaps vary from substantially zero at the equator to over 50 percent at the poles. "Overlap" is defined as the region on the ground where an Individual Subscriber Unit (ISU) or other earth-based user transmitting to and receiving from a satellite would be within the antenna pattern and recognized as a valid user by either of the satellites.

The calculation of the antenna coverage pattern is well known to those skilled in the art. By knowing parameters of a satellites orbit (i.e., altitude and distance of the surface of the earth), the characteristics of the antenna (i.e., gain, radiation pattern), the power of the transmitter, and the receivers' sensitivity, the size and shape of the coverage pattern for each antenna cell and antenna can be calculated for any point of the satellites orbit. See for example, "Antennas", by John D. Kraus, 1950, McGraw Hill Company, N.Y.

Figure 3:
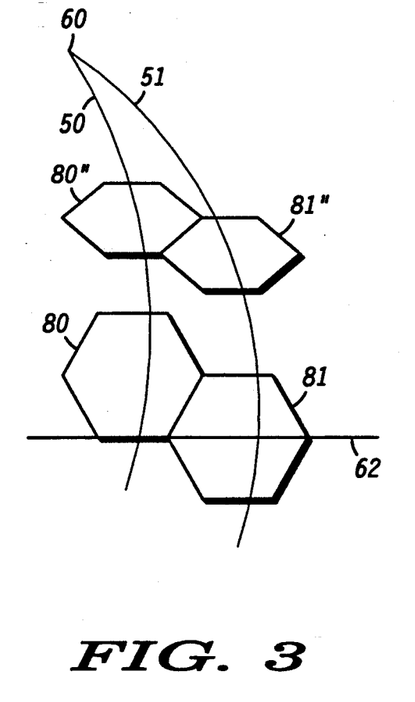
FIG. 3 is a simplified view showing antenna coverage patterns of adjacent satellites as projected on the earth with antenna cell management and at different points in their polar orbits.

FIG. 3 is a simplified view showing antenna coverage patterns (i.e. "footprints") 80 and 81 of satellites 42 and 41, respectively, of FIG. 1 as projected on the earth at different points in their orbits with antenna cell management according to the present invention.

FIG. 3 show the patterns 80 and 81 at equator 62 and the respective size of antenna coverage patterns (patterns 80" and 81") as they near pole 60 when utilizing the cell management system of the present invention. The overlap of the cells shown in FIG. 3 near pole 60 has been reduced or eliminated. In FIG. 3, each satellite has an antenna coverage pattern such that, at equator 62 antenna coverage patterns 80, 81 of adjacent satellites are adjacent, i.e., in contact but not greatly overlapping. This is needed to provide total coverage at the equator. The antenna cell management method and system of the present invention modulates or turns various cells on/off so as to maintain this "in contact but not greatly overlapping" condition as the satellites approach and depart the poles.

While the antenna coverage patterns in FIGS. 2–3 are shown as having hexagonal outlines they may have different shapes and still achieve the desired coverage. For example, the outlines could be rectangular, circular, rhombic, or other shapes as desired for a particular application. The approximate hexagonal shape shown in FIG. 3 is preferred.

Figure 4:
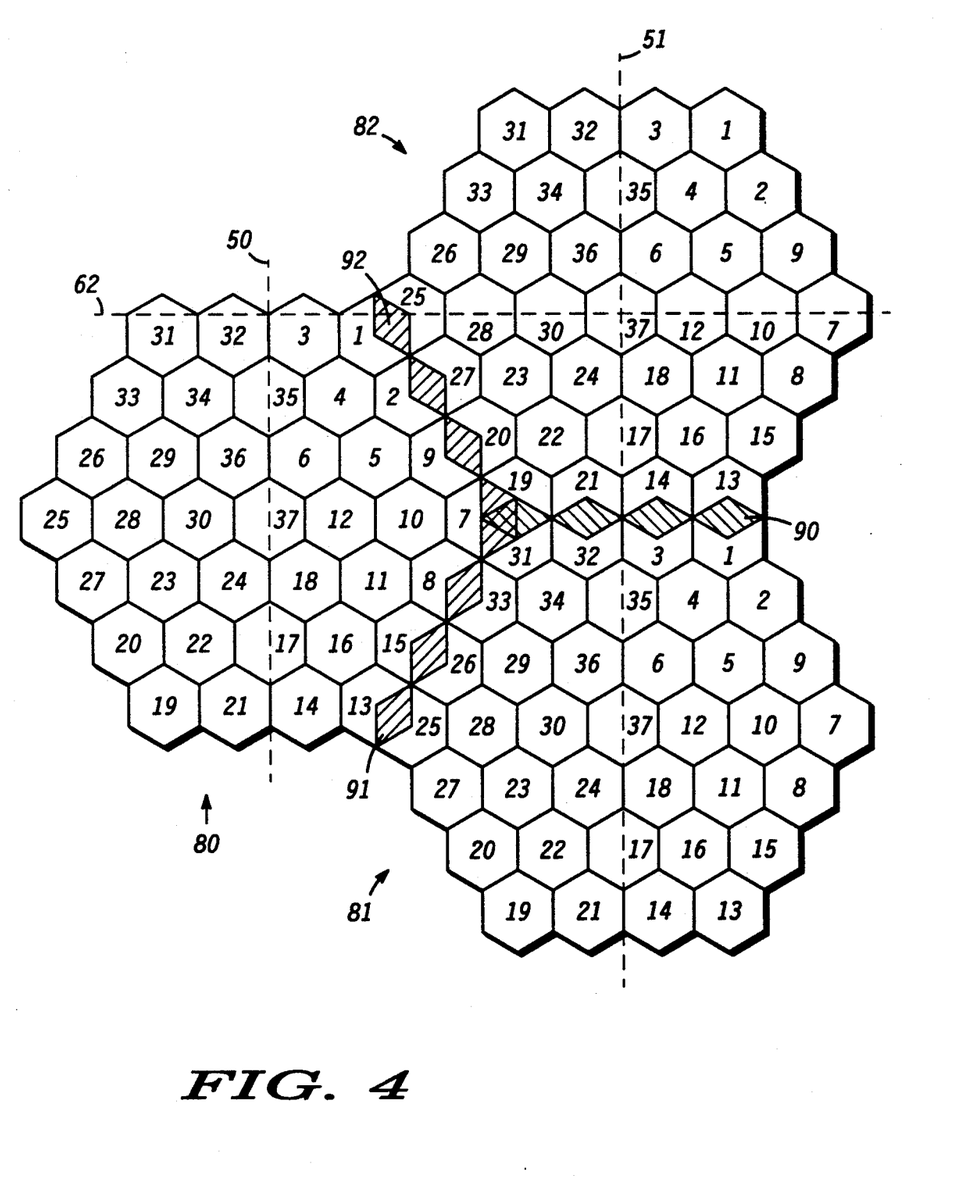
FIG. 4 is a diagram showing preferred antenna coverage patterns (i.e. "foot-prints") of three adjacent satellites and the individual cells within each foot-print.

FIG. 4 shows antenna coverage patterns 80, 81, 82 of three satellites (e.g., 42, 41, 40 respectively), including the individual cells that make up each antenna coverage pattern or footprint as they appear at equator 62. Orbital paths 50 and 51 are also shown.

Antenna coverage pattern 81 has region of overlap 90 with antenna coverage pattern 82. Overlap region 90 is hatched at 135° for easy visibility. The amount of overlap in region 90 is constant because the separation distance between the two satellites is a constant. This type of overlap occurs between all satellites in the same orbit. The amount of overlap region 90 is generally arranged to be small so as to promote minimum interference yet not leave gaps.

Antenna coverage pattern 80 has overlap regions 91 and 92 with antenna coverage patterns 81 and 82, respectively. Overlap regions 91, 92 are hatched at 45° for easy visibility. These overlap regions constantly change as a function of the orbital position of the relatively moving satellites. At the equator, overlap regions 91,92 are also generally small.

Antenna coverage patterns 80, 81, 82 are comprised of smaller elements called cells. The number and shape of the cells are a function of the type and number of antenna or antennas on the satellite. For the example shown in FIG. 4, the satellites antennas each produce 37 cells, labeled cell 1 thru cell 37. Typically, each cell arises from one element of an antenna on the satellite. For example, the satellite antenna can be an array of microwave horn antennas such that each horn gives rise to a specific cell. Alternatively, the antenna can be one or more phased array antennas and be electrically steered to cover each cell, or a combination thereof. These and other forms of antennas having predetermined coverage patterns are well known to those skilled in the art.

Any means for producing a multiple cell antenna pattern may be used. The antenna pattern foot-print on the earth's surface is typically altered by turning on and off or modulating various portions of the satellite antennas producing the individual cells. It is also possible to vary the coverage or extent of individual cells, that is, change their shapes/size/location rather than merely turning them on/off.

While, in this example there are 37 cells per satellite antenna foot-print there can be any number of cells. Those of skill in the art will understand that the number of cells is a function of the economics of the system and the desired capacity.

For communication between a satellite and a number of earth based stations, generally only a limited number of communication frequencies or channels are available. Spatial diversity between satellite antenna beams is desirable because satellite communication capacity with a plurality of earth stations increases according to the number of cells projected by the satellite antenna system.

A satellite nadir is defined as that point on the surface of the earth intersected by a line that projects from the center of the earth thru the center of the satellite. The centers of the various cells projected by a satellite antenna generally maintain a constant distance from the satellite nadir. The nadir cells for antenna coverage patterns 80, 81, and 82 are shown in FIG. 4 as cell 37. The center of cell 37 is typically (but not essentially) on the nadirline. Thus, as the antenna pattern sweeps over the earth, the centers of the cells 1–36 are a constant distance from the center of cell 37 for a satellite moving at a constant altitude and with constant cell size. If the cell size is changed then there is a corresponding change in the cell-to-cell distance. The distance may be represented as many meters or miles on the surface of the earth or as an inter-cellular angle knowing the satellites altitude.

The center of each of the cells projected onto the surface of the earth has a specific longitude and latitude as a function of time for each point in the satellite orbit, hereafter called the lat/lon/time position. Given this lat/lon/time position and the cells sizes, the amount of overlap of cells from adjacent satellites is determined as a function of time or orbital position. Orbital position includes not only a longitude and latitude type reference but also includes an altitude factor.

Because the satellite orbits the earth typically in a circular orbit while the earth is not a perfect sphere, the antenna patterns size can vary as a function of the orbital position. The patterns size will also vary for different satellites over the same location on the earth if they are at different altitudes.

Figure 5:
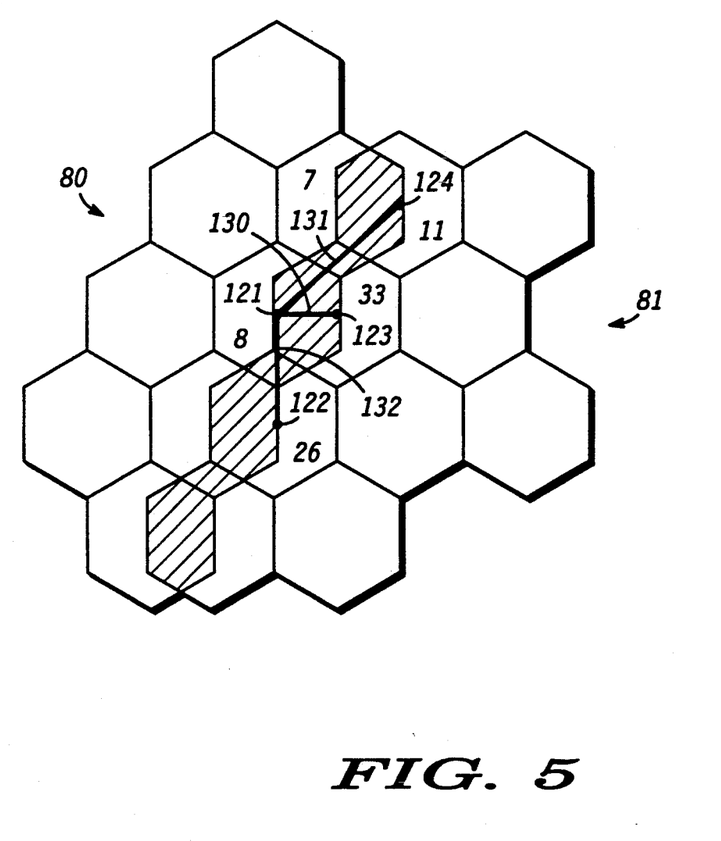
FIG. 5 shows an example of adjacent antenna pattern cells with center-to-center distances among several cells marked thereon.

The "distance" between the center of each of the cells of neighboring antenna patterns is computed and then compared against a table of predetermined acceptable center-to-center distances between cells. FIG. 5 shows an example of cells from intersecting antenna patterns 80 and 81 whose cells center-to-center distance is being calculated. The overlap regions are hatched at 45° for easy visibility. The "distance" may be calculated using any convenient coordinate system.

Cells 8 and 7 are from antenna patterns 80 (see FIG. 4) and cells 11 and 33 are from antenna patterns 81. The centers of some of the overlapping cells are indicated by dots 121 thru 124. The distances between center 121 of cell 8 and other centers are shown in FIG. 5 by distance lines 130–132. For example, there is distance 130 to center 123 of cell 33, distance 131 to center 124 of cell 11 and, distance 132 to center 122 of cell 26.

If cells 7, 8 and 33, 11, 26 are converging, a decision needs to be made concerning which cell or cells are to be modulated, e.g. to turn off. In FIG. 5, the present overlap is not sufficient to warrant turn-off since gaps in coverage will exist if, for example, either cell 8 or 33 are turned off. But eventually, as the orbit progresses, the overlap will be such that colliding cell 8 or 33 should be turned off. The preferred turn-off point is where the area of one cell overlaps about 70% of the other cell. The calculation of the actual center-to-center distance turn-off threshold which results in a 70% overlap is a function of the actual shape of the cells. Alternatively, the preferred turn-on point is where the area of one cell gaps about 10% of the other cell. The calculation of the actual center to center distance turn-on threshold which results in a 10% gap is a function of the actual shape of the cells. Those of skill in the art will understand based on the description herein, how to calculate such turn-on/off points based on the cell size, shape and desired overlap amount.

It is important that there continue to be sufficient power density at the location of an ISU on the earth so it can still transmit to and receive from a satellite. Cells are turned off as the satellites move toward the poles and turned on as the satellites move toward the equator. Turn-off occurs when the center-to-center distance between colliding cells decreases to a value where a cell can be turned off without creating a gap in antenna coverage. It is preferred to turn off cells of the lower angle satellite, i.e., the satellite having the smallest angle measured from the horizon of the ISU (or the largest angle measured from the nadir). Cells of the satellite most nearly directly overhead are preferred to cells of a satellite at a small angle to the ISUs horizon and a large angle to the ISU nadir line.

While the foregoing discussion describes the overlapping cells as being turned on or off, those of skill in the art will understand based on the description herein that other means or arrangements for avoiding undesirable overlaps can also be used. Non-limiting examples are changing cell sizes or location or numbers of cells or changing the antenna gain in such overlap regions so as to favor one satellite over another to avoid interference. As used herein in reference to satellite antenna patterns, references to turning cells on or off are intended to include such alternative means of locally affecting antenna sensitivity or pattern so as to avoid interference or uncertainty of satellite selection by the ground station or unit (e.g. an ISU).

Figure 6:
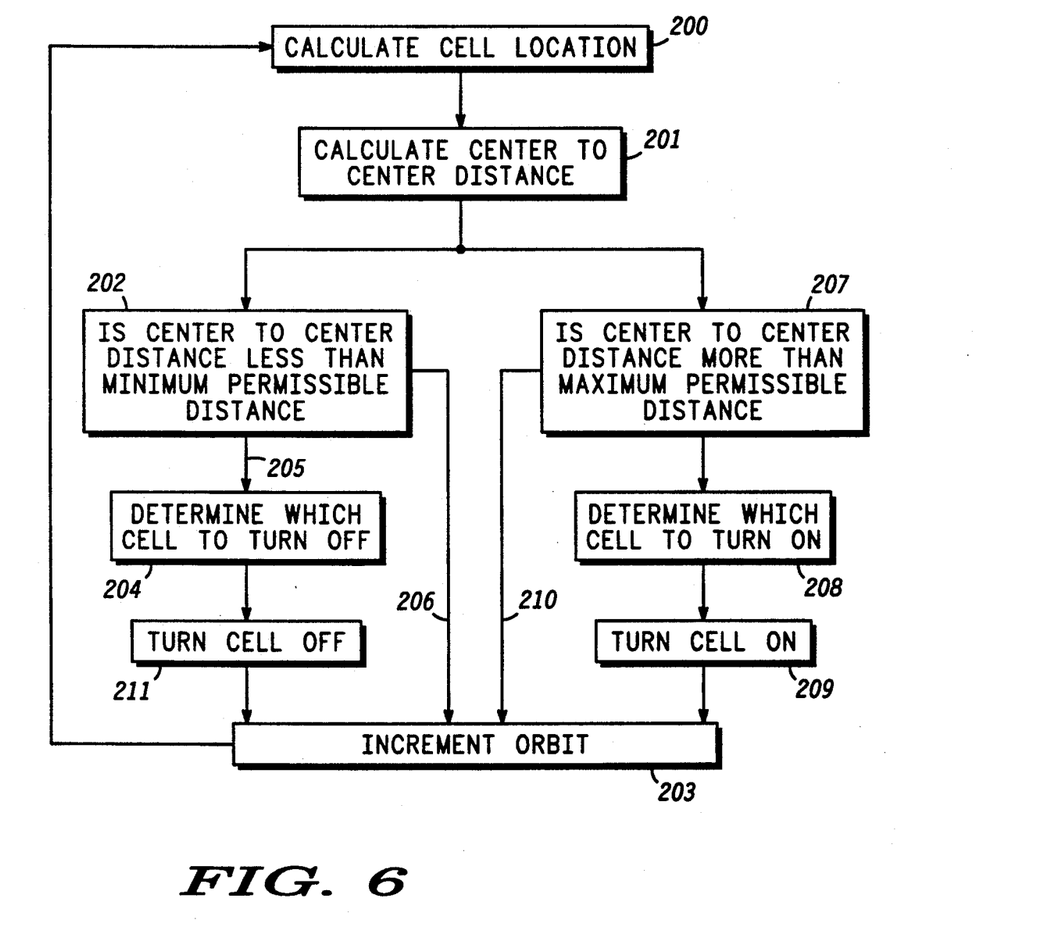

FIG. 6 is a simplified flow diagram showing the preferred method for determining which cell to turn off or turn on. The method preferentially starts with the satellites at or very near the equator. This is the location where, generally, all the cells of each satellite are on. The latitude and longitude of (preferably) the center of each cell of each satellite when on or near the equator is calculated and stored in block 200. Next, in block 201, the center-to-center distance between cells is calculated and stored. For ease of explanation, the cells are assumed to be the same shape and have the same enclosed area. For different shapes and areas, each center-to-center distance is compared to a unique "permissible distance", depending on the specific shapes and sizes. This is easily done with standard programming and a general purpose computer. The calculation need not be done for every cell in the antenna pattern relative to every other cell in the adjacent antenna pattern. Rather, the distances from a turned-on cell at the periphery of a particular antenna pattern to the three nearest turned-on cells of the adjacent antenna pattern may be calculated. While the three nearest turned-on cells are adequate, there may be instances, for example, near the "corners" of the antenna cell patterns (e.g., cells 31, 25, 19, 13, 7, 1, of FIG. 4), where more than three may desirably be used. This is done for each cell on the periphery of the antenna pattern which is affected by changing overlap.

FIG. 5, for example, shows that the distances between cell 8 and cells 26, 33, and 11 are to be calculated. These distances are used in the determination of the "best mode point", where the best mode is that point when turning off of a cell will result in the least amount of unacceptable cell overlap without having an unacceptable gap in coverage.

The definition of best mode will vary as a function of the terrain beneath the satellite. The best mode determinants can be made up of many factors. For example, the best mode may permit large gaps in coverage over the oceans and artic (few ISU's) while permitting large amounts of overlap in densely populated areas (many ISU's). The best mode is also affected by the actual antenna pattern. For example, when the antenna is a very narrow beam, the power density at the center of the cell is much higher than at the edges of the cell, as opposed to the antenna with a broader pattern where the power density at the center of the cell may not be much different from that at the edges of the cell.

The center-to-center data is then sent to block 202 where an analysis is done to determine if the center-to-center distance is less than the minimum permissible center-to-center distance for that antenna pattern at that particular satellite location (or orbital time). This is done for each of the distances calculated in block 201. Should the answer be that there are no center-to-center distances less than the minimum permissible distance, (i.e., arrow 206), then the orbital position for which the computations are being made is incremented in block 203, for example, by 0.1 degree latitude and the corresponding longitude. New cell locations are re-calculated based on the new assumed orbital position in block 200 and the process continues. Should the answer be that there are center-to-center distances less than the minimum permissible distance, then (via arrow 205) the center-to-center data is sent to block 204 to determine which cell to turn off.

The determination of which cell to turn off made in block 204, is done in several ways as desired by the user. For example, (1) alternate cells can be temporarily turned off between adjacent satellites to see which arrangement gives the best performance (e.g., best signal to noise ratio) for the ISU's using the cell, (2) the choice of cell to be turned off can be made based on which cell and/or satellite has greater or lesser actual or anticipated loading, (3) the choice may be determined by which of the particular cells involved may have poorer intrinsic performance (e.g. downgraded by wear and tear), and/or (4) a combination of these and/or other factors selected according to a predetermined weighting decision strategy which is stored in the satellite or transmitted from the ground or both. For example, in FIG. 5, instead of turning off cell 8 or 33 as the cells converge it may be more advantageous to turn cell 7 off due to geographic, performance, or political considerations. Political considerations are, for instance, a requirement to comply with various governmental regulations within territorial boundaries or avoid impinging on a particular territorial boundary.

Tailoring is desirably used to adjust for any gaps in coverage that arise from a particular cell being turned off or otherwise changed in shape, size, location, power, etc. For example, if the center-to-center distances after the selected cell has been turned off exceed the maximum permissible center-to-center distances, gaps in coverage may occur. If the analysis shows that a coverage gap will occur due to turning off a specific cell at a particular time the control system can allow the gap to exist or to direct the same or another cell to remain on or turn on to avoid the gap. For example, a gap is likely to have little detrimental effect, say over the ocean or late at night, but a great detrimental effect over populated areas or during peak usage hours. Thus, the position of the satellites relative to earth features (e.g. particular lat/lon/time) is of concern. If there is no gap to be accounted for, then the cell is turned off without analysis based on the located lat/lon/time. The selected cell is then turned off in block 211.

The process proceeds to block 203, the assumed or actual orbital position is incremented; and the process continues until the satellites have converged at their respective poles. Turning off unnecessary cells has the great advantage of conserving satellite power as well as reducing interference.

At the poles all the cells that are to be turned off will have been turned off and now the satellites will begin to diverge. When the satellites diverge it is necessary to turn cells back on to maintain the coverage without excessive overlap or unacceptable gaps in coverage. When the satellites are diverging, the information that was previously sent to block 202 is instead sent to block 207 where an analysis is done to determine if the center-to-center distance is more than the maximum permissible center-to-center separation distance. This is done at least for those active cells of the satellites at or near the footprint intersection boundary in much the same manner described for the converging satellites.

When the center-to-center distance is less than or equal the maximum permissible distance, then no cells are turned on. Via line 210, the assumed or actual orbital position is incremented in block 203, and the new cell locations calculated in block 200, based on the new assumed orbital position, and the process continues.

When the center-to-center distance is more than the maximum permissible center-to-center distance, then coverage gaps are about to occur and a decision to turn-on a cell is needed. This is done in block 208 using strategy and tactics analogous to that described previously in connection with block 204. The function of block 204 and 208 can be provided by the same logical apparatus and the same software or firmware or code, taking into account that in the first (satellites approaching) instance, colliding cells are "on" and need to be turned "off" and in the second (satellites receding) instance, separating cells are "off" and need to be turned "on".

The desired cell is then turned on in block 209. At this point a command is issued to block 203 to increment the assumed or actual orbital position and the process continues until the satellites have reached the equator. At the equator, 180 degrees of orbital latitude has been executed and the convergent path recommences and block 202 is once again functioning. This process continues until a full 360 degrees of orbital latitude has been executed. This constitutes one orbital scan. Meanwhile the earth has turned under the orbiting satellite so that the satellite returns to the equator at a different longitude from whence it started. As the satellite continues its 360 degree latitude orbits it continues to precess in longitude until it eventually returns to the starting longitude, whereupon the satellite begins once again to pass over the same locations on earth. The period from the the initial starting time until the longitude repeats is called a complete cyclical orbital time. Knowing the complete cyclical orbital time, the cyclical orbital time for each cell of a satellite can be determined. This is needed because the earth is rotating within the orbiting constellation and the tailoring of the cell turn-off and turn-on requirement to take terrain variations into account depends on the latitude and longitude of a satellite and satellite antenna footprint.

Once the data for each satellite cell turn-on and turn-off is obtained, a schedule of the turn-on and turn-off of the cells as a function of orbit is developed. For example, the schedule can be based on time or on satellite location in terms of longitude and latitude or angle or any convenient reference frame. This schedule may be loaded in the satellite prior to launch and/or updated or loaded after insertion into orbit. The turn-on and turn-off schedule and decision criteria are desirably updated from time to time as the orbital parameters and/or satellite properties change.

Minimal ground control is required after the satellite is in orbit and the ground based satellite control system need only handle exceptions or updating of the cell control program to account for the drift or hardware degradation or other changes. For example, the pre-programmed onboard satellite antenna cell pattern memory may be modified by the ground based satellite control system to account for a cell whose performance has degraded. Another example is where one satellite is nearing maximum capacity and if one particular cell was turned off, it could improve its communication capacity by switching heavy traffic in that cell to another satellite. The converse is true in the case of satellites moving away from the pole when the decision to turn cells on can be determined by the traffic a satellite or cell is currently carrying.

Figure 7:
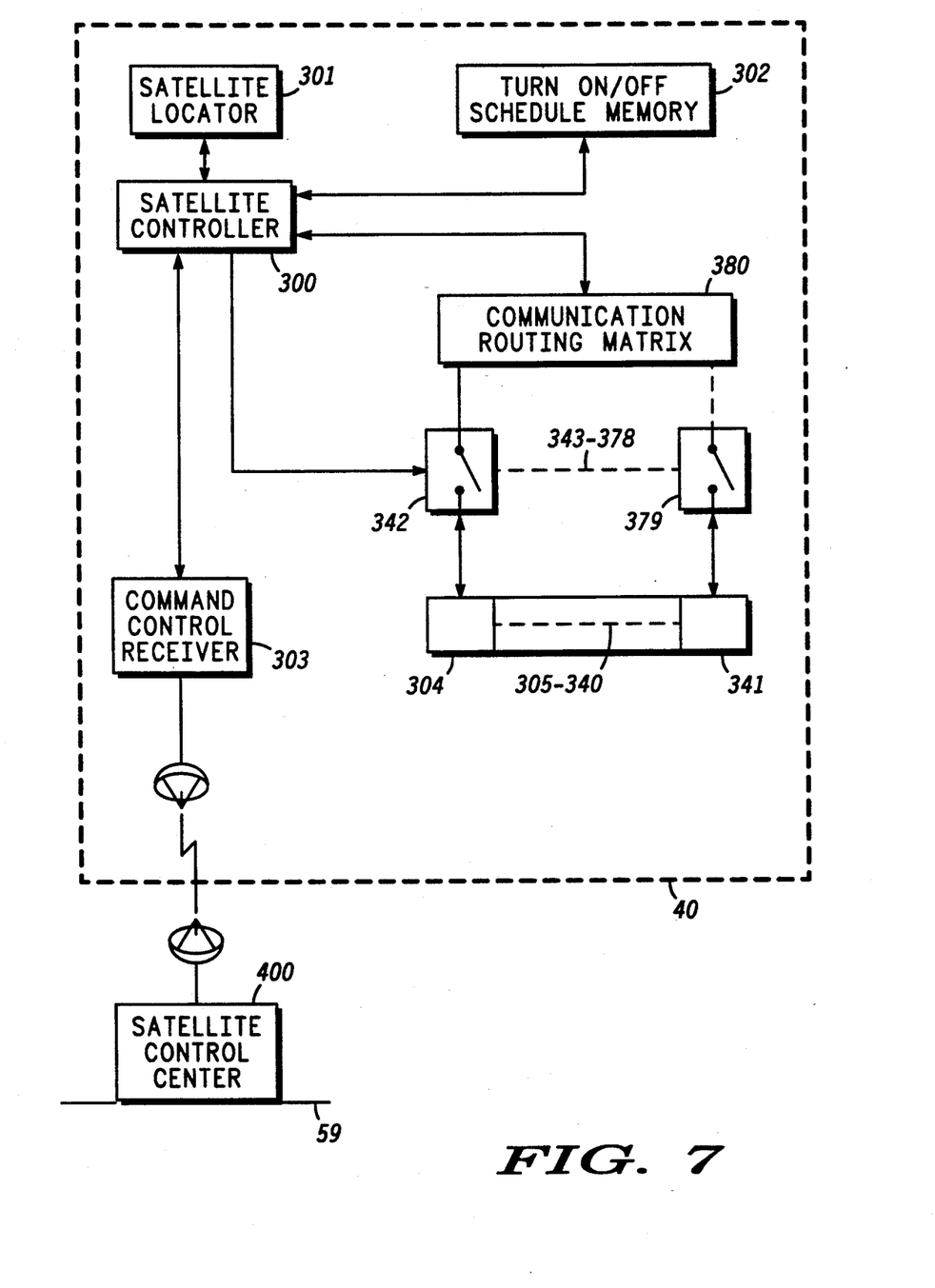
FIG. 7 shows a hardware embodiment for carrying out the satellite cell management method.

FIG. 7 shows a preferred hardware embodiment for executing the above-described satellite cell management invention. FIG. 7 shows satellite 40 which comprises satellite controller 300, satellite locator 301, turn on/off schedule memory 302, command control receiver 303, individual cell transmit/receive/antenna arrays 304-341, on/off switches or cell pattern, position or power modulators 342-379 and, communication routing matrix 380. Satellite control center 400 is typically located on earth 59 but could be in another satellite. In the preferred embodiment of the invention, the predicted turn on/off schedule is calculated prior to satellite launch and loaded into turn on/off schedule memory 302. The schedule contains the specific longitude and latitude and/or time where each specific cell should be turned on or off or otherwise modulated.

Once placed in proper orbit, the satellite operates as follows. The following description assumes that a new satellite is being inserted to replace a pre-existing satellite already carrying traffic, but those of skill in the art will understand that substantially similar procedures are used for a first-time satellite installation and set-up. Satellite Control center 400 transmits to satellite 40 the location of satellite 40. Satellite 40, knowing its initial location tracks its position until it crosses the equator or other predetermined location at which point the cells are turned on for the first time. At this point all the traffic from the satellite previously in that orbital location is rerouted through new satellite 40 by commands from satellite control center 400. If a predecessor satellite existed, it may at this time be de-orbited, moved to another orbit for reuse, or "put to sleep" until needed. Satellite controller 300 periodically or constantly monitors satellite locator 301 which keeps track of the satellites orbital position as a function of time, e.g. by calculating it based on known initial conditions or using a look-up table or by ground station query and response or by use of a Global Positioning System, or a combination thereof.

When the location indicated in satellite locator 301 matches a location in turn on/off schedule memory 302 satellite controller 300 directs the appropriate switch (342-379) to open or close or vary as required. Switches 342-379 are shown as simple on/off switches interrupting the flow of signals from communication routing matrix 380 to receive/transmit/antenna array 304-341. In actual practice, this function may be done by removing the power to the transmitter and receiver circuits for the cell or any other convenient means. Shutting off the transmitter power has a particular advantage in conserving power on the satellite. Other means of controlling cellular antenna signals and/or power flows are well known to those skilled in the art. Control center 400 and controller 300 route the affected traffic to or from another cell on the same or another satellite.

Immediately prior to the command to switches 342-379, an onboard analysis of the satellite communication traffic being handled by communication routing matrix 380 is done by satellite controller 300. This is desirable to allow for possible modification of the turn on/off schedule to provide the best mode of operation. Should the analysis indicate that there is no problem, then the action required by the data stored in turn on/-off schedule memory 302 is carried out.

Should the analysis of traffic indicate that following the pre-set turn on/off schedule in memory 302 would cause a problem, controller 300 is desirably programmed to: (1) in the case of minor problems, initiate the turn on/off command as scheduled which may cause lower priority calls to become noisy or be interrupted, or (2) in the case of major problems, desirably to contact satellite control center 400 for further instructions. Satellite control center 400 then desirably analyzes the situation and directs the appropriate action. For example, satellite control center 400 may direct that alternate capacity be made available or may direct certain calls to be terminated or may shift some traffic to other satellites. Where the condition is likely to persist, the turn on/off schedule memory is desirably altered.

The choice of the use of positional location (i.e., longitude and latitude, or angle and altitude) for keeping track of satellite position is solely for convenience. The turn on/off table can also contain time information and satellite controller 300, instead of comparing locations, compares time. The position of any satellite can be described as a function of location and/or time. If time is known, location can be determined. If location is known, time can be determined. Either will meet the needs of the satellite system cell manager.

When time is chosen as the unit of measure it is desirable to periodically reset the satellite clock. After a certain amount of time, satellite 40 will have completed a single orbit, utilizing the information gathered in one orbital scan. After a number of orbits satellite 40 will have completed all the available orbital scans and the clock is reset after each orbital cyclical time period. Otherwise, the satellite would only operate properly for one orbital cyclical time period. If the location of the satellite is used instead of time then there is nothing to reset. When the satellite starts to repeat its location the cycle begins anew on its own accord. It is possible to determine the cyclical orbital position of each cell based on the knowledge of the total orbital cycle. An advantage of a location reference over a time reference is that it facilitates the start up of new satellites.

In a preferred arrangement employing seventy-seven low earth orbiting satellites having seven orbits and eleven satellites per orbit, each orbiting satellite is moving in the same direction as its neighbor except for the orbits at the seam (see FIG. 1). In orbits where the satellites are moving in the same direction, the cells will be moving horizontally (east-west) relative to one another at much less than the approximately 26,000 Mph orbital velocity. But at the seam, the cells will not only be moving horizontally (east-west) relative to each other but also move in different vertical (north-south) directions. Thus, the cells along the seam must be turned on and off at a higher rate in order to maintain a continuous antenna pattern coverage. This present method and apparatus accommodates these differences in relative velocity.

A further benefit of this invention is that as the satellite communication system evolves, the number of cells will likely increase. For example, suppose an initial satellite cellular system has 37 cells per satellite. In order to improve capacity and service additional users, a newer 74 cell satellite is placed in an adjacent orbit. The means and method described herein is independent of the number of cells in a particular satellite antenna pattern. Further, additional satellites can also be used.

A further benefit of the present invention is that it compensates for the different antenna coverage when satellites are at higher or lower orbits than the nominal. This is important since the altitudes of the satellites will likely be different to minimize the possibilities of polar collisions. A further benefit of the preferred embodiment of the invention is that the procedure and schedule of cells to be turned on and off is conveniently stored in the satellite and is available to facilitate handing-off existing calls in progress from one cell to another cell without interruption of the calls. Thus, the problem of handing off a call being made in one cell to another cell when the first cell is no longer available is made easier. Turning-off interfering cells also conserves power.

Having thus described the present invention, it is apparent that the present invention provides a means and method whereby orbital satellite antenna cell coverage may be managed in a manner that adjacent cell interference is minimized while not allowing for excessive gaps to occur in antenna coverage regardless of the location of the satellites and cell coverage on the surface of the earth. Satellite power is conserved and local traffic variations or other unpredictable anomalies are accommodated.

By now it should be appreciated that there has been provided a novel way for cell management of satellite cellular communication system without which the capabilities of orbiting satellites communications systems would severely hindered.

While the invention is described in terms of specific examples and with specific preferred embodiments, it is evident that many alternatives and variations will be apparent to those skilled in the art based on the description herein, and it is intended to include such variations and alternatives in the claims that follow.

What is claimed is:

1. A method of operation of a satellite communication system, comprising:

enabling first and second communication satellites having, respectively, first and second multicelled antenna patterns which move over the surface of the earth relative to each other and overlap by varying amounts as the orbital paths of the satellites converge and diverge, wherein the first and second satellites are active a majority of their orbits and simultaneously service substantially different, but adjacent geographical areas;

determining, respectively, the relative locations of first and second multicelled antenna coverage patterns of antennas of the first and second satellites;

determining positions in the orbits of the first and second satellites when the first and second multicelled antenna coverage patterns overlap by varying amounts as the satellites move with respect to each other; and modifying the antenna coverage pattern of one or both satellites as a function of orbital position to avoid substantially interfering overlap or significant no-coverage gap.

2. The method of claim 1 wherein the first determining step comprises computing locations of centers of at least peripheral cells of the multicelled antenna patterns.

3. A method of operation of a satellite communication system involving two or more satellites whose antenna patterns overlap or gap during some portion of an orbit of at least one of the satellites, comprising:

determining, respectively, first and second antenna coverage patterns of antennas of first and second satellites;

determining when the first and second antenna coverage patterns overlap or gap as one of the first or second satellites moves with resect to the other; and modifying the antenna coverage pattern of one or both satellites as a function of time to avoid substantially interfering overlap or significant no-coverage gap, wherein the antenna converge patterns comprises cells whose activity is adapted to be modified, wherein the first determining step comprises computing locations of centers of at least peripheral cells of the antenna patterns, and wherein the first determining step further comprises calculating center-to-center distances of approaching or receding cells of the first and second antenna coverage patterns.

4. A method of operation of a satellite communication system involving two or more satellites whose antenna patterns overlap or gap during some portion of an orbit of at least one of the satellites, comprising:

determining, respectively, first and second antenna coverage patterns of antennas of first and second satellites;

determining when the first and second antenna coverage patterns overlap or gap as one of the first or second satellites moves with respect to the other; and modifying the antenna coverage pattern of one or both satellites as a function of time to avoid substantially interfering overlap or significant nocoverage gap, wherein the antenna coverage patterns comprise cells whose activity is adapted to be modified, wherein the first determining step comprises computing locations of centers of at least peripheral cells of the antenna patterns;

wherein the first determining step further comprises calculating center-to-center distances of approaching or receding cells of the first and second antenna coverage patterns; and wherein the calculated center-to-center distances are compared to predetermined center-to-center distances for the same cells and the antenna coverage pattern of one or both satellites modified when the calculated center-to-center distances different from the predetermined center-to-center distance so as to result in substantial interference or non-coverage gap as the satellites approach or depart.

5. The method of claim 1 where the multicelled antenna coverage patterns are modified by incrementally changing the number or size or location of the cells.

6. A method for controlling the operation of multi-satellite communication system, comprising:

determining information concerning the orbital position or time when an antenna pattern of a first orbiting satellite substantially overlaps or gaps an antenna pattern of a second satellite in a different but approaching orbit wherein both antenna patterns move over the surface of the earth and relative to each other and service, except for overlap, different geographic regions;

storing information related thereto on board the first or second satellite or both; and based on such stored information, incrementally modifying the antenna pattern of one or both satellites to reduce the overlap or gap during portions of the orbit when the satellites converge or diverge.

7. The method of claim 6 wherein the modifying step further comprises modifying the antenna pattern of one or both satellites to substantially maintain contact between the antenna patterns as the satellites diverge by alternately, between satellites, turning at least one of the antenna cells on or off as needed.

8. The method of claim 6 wherein the first determining step comprises determining a cyclical orbital time when the antenna pattern of the first satellite substantially overlaps the antenna pattern of the second satellite and the modifying step comprises modifying the antenna pattern of one or both satellites whenever such orbital times repeat.

9. The method of claim 8 wherein the storing step comprises storing the predetermined orbital times when overlap is significant enough to cause signal interference between unmodified antenna patterns of converging satellites so as to warrant modification of an antenna pattern and the modifying step comprises modifying the antenna pattern when actual orbital time substantially equals the predetermined orbital times.

10. The method of claim 9 further comprising periodically updating the predetermined orbital times at which antenna pattern modification is desired to avoid substantial interference.

11. The method of claim 6 wherein the antenna pattern being modified comprises cells and modification of the antenna pattern comprises turning interfering cells off and gaping cells on.

12. The method of claim 6 wherein the first determining step comprises determining a cyclical orbital position when the antenna pattern of the first satellite substantially overlaps the antenna pattern of the second satellite and the modifying step comprises modifying the antenna pattern of one or both satellites whenever such orbital positions repeat.

13. The method of claim 12 wherein the storing step comprises storing the predetermined orbital positional information concerning when overlap is significant enough to cause signal interference between unmodified antenna patterns of converging satellites so as to warrant modification of an antenna pattern and the modifying step comprises modifying the antenna pattern when actual orbital position information substantially equals the predetermined orbital positional information indicating substantial signal interference.

14. The method of claim 13 further comprising periodically updating the the predetermined orbital positional information at which antenna pattern modification is desired to avoid substantial interference.

15. The method of claim 13 wherein the antenna pattern being modified comprises cells and the predetermined stored orbital positional information comprises minimum intercellular distances of overlapping or gaping cells.

16. The method of claim 15 wherein modification of the antenna pattern comprises turning interfering cells off when the actual intercellular distances are less than the stored minimum predetermined intercellular distances.

17. The method of claim 6 further comprising modifying the antenna pattern of whichever satellite has a larger angle to a nadir of a ground based user of the system.

18. A system for managing satellite antenna coverage of a non-geostationary orbiting multi-satellite system for providing communication services to users on earth to avoid interference or gaps between antenna patterns of approaching or departing satellites, comprising:

memory means for storing information concerning predetermined portions of an orbit when an antenna pattern of one active satellite will or will not interfere which an antenna pattern of another active satellite, wherein said antenna patterns of said active satellites move over the surface of the earth as a consequence of the orbits;

satellite locator means for determining current orbital information of the one satellite; and controller means for comparing such current orbital information to the stored orbital information to determine when a predetermined decision criteria is met, and then incrementally modifying an antenna pattern associated with the one or another satellite to avoid substantial interference or gaps between their antenna patterns while both satellites continue providing communication services.

19. The system of claim 18 wherein the system further comprises a communication routing matrix for altering routing of transmitted or received signals to or from individually controllable cells of an antenna.

20. The system of claim 18 wherein the memory means, locator means and controller means are on board the one or the another satellite.

21. The system of claim 18 wherein the antenna pattern contains cells and wherein the controller means for modifying an antenna pattern further comprises means for turning off or on individual antenna cells.

22. The system of claim 18 wherein the antenna pattern contain cells and wherein the controller means for modifying an antenna pattern further comprises means for varying the shape or size of individual antenna cells.

23. A method of operation of a non-geostationary orbiting satellite communication system involving two or more satellites whose antenna patterns overlap or gap during some portion of an orbit of at least one of the satellites, comprising:

determining, respectively, first and second multicelled antenna coverage patterns of antennas of first and second satellites;

determining when the first and second multicelled antenna coverage patterns overlap or gap as one of the first or second satellites moves with respect to the other; and incrementally modifying the antenna coverage pattern of one or both satellites as a function of time by altering one or more of the multiple cells of one or both of the antenna patterns to avoid substantially interfering overlap or significant no-coverage gap while both satellites continue to provide communication services.

24. A method of operation of a non-geostationary orbiting satellite communication system involving two or more satellites whose antenna patterns overlap or gap during some portion of an orbit of at least one of the satellites, comprising:

determining, respectively, first and second antenna coverage patterns of antennas of first and second satellites;

determining when the first and second antenna coverage patterns overlap or gap as one of the first or second satellites moves with respect to the other; and incrementally modifying the antenna coverage pattern of one or both satellites as a function of time to avoid substantially interfering overlap or significant no-coverage gap while maintaining operation of both satellites.

25. A method of operation of a non-geostationary orbiting satellite communication system involving two or more satellites whose antenna patterns overlap or gap during some portion of an orbit of at least one of the satellites, comprising:

determining, respectively, first and second multicelled antenna coverage patterns of antennas of first and second satellites;

determining when the first and second multicelled antenna coverage patterns overlap or gap as one of the first or second satellites moves with respect to the other; and incrementally modifying peripheral cells of the multicelled antenna coverage pattern of one or both satellites as a function of time to avoid substantially interfering overlap or significant no-coverage gap while both satellites continue providing communication to users on earth.

* * * * *

UNITED STATES PATENT AND TRADEMARK OFFICE
CERTIFICATE OF CORRECTION

PATENT NO. : 5,227,802
DATED : July 13, 1993
INVENTOR(S) : Michelle Pullman et al.

It is certified that error appears in the above-indentified patent and that said Letters Patent is hereby corrected as shown below:

Column 12, line 59, claim 3, change "comprises" to --comprise--.

Column 13, line 26, claim 4, change "different" to --differ--.

Signed and Sealed this

Twenty-eighth Day of June, 1994

Attest:

BRUCE LEHMAN

*Attesting Officer*    *Commissioner of Patents and Trademarks*